US008538023B2

(12) United States Patent
Yao

(10) Patent No.: US 8,538,023 B2
(45) Date of Patent: *Sep. 17, 2013

(54) METHODS AND APPARATUSES FOR ADMINISTRATOR-DRIVEN PROFILE UPDATE

(75) Inventor: Zongming Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/120,648

(22) PCT Filed: Mar. 29, 2010

(86) PCT No.: PCT/CN2010/000388
§ 371 (c)(1),
(2), (4) Date: Mar. 23, 2011

(87) PCT Pub. No.: WO2011/120184
PCT Pub. Date: Oct. 6, 2011

(65) Prior Publication Data
US 2013/0010958 A1    Jan. 10, 2013

(51) Int. Cl.
H04L 9/00          (2006.01)

(52) U.S. Cl.
USPC ............................. 380/270; 726/6; 455/435.1

(58) Field of Classification Search
USPC ........................ 380/270; 726/6; 455/435.1
See application file for complete search history.

(56) References Cited

U.S. PATENT DOCUMENTS

| 5,661,807 | A * | 8/1997 | Guski et al. ............... 713/159 |
| 5,832,087 | A * | 11/1998 | Hawthorne ............... 380/283 |
| 6,298,136 | B1 * | 10/2001 | Den Boer ................. 380/29 |
| 7,386,731 | B2 * | 6/2008 | Sanai et al. .............. 713/183 |
| 7,543,118 | B1 * | 6/2009 | Chen et al. .............. 711/154 |
| 7,787,863 | B2 * | 8/2010 | van de Groenendaal .. 455/411 |
| 7,882,553 | B2 * | 2/2011 | Tuliani .................. 726/9 |
| 7,937,699 | B2 * | 5/2011 | Schneider ................ 717/173 |
| 8,006,300 | B2 * | 8/2011 | Mizrah .................. 726/20 |
| 8,090,201 | B2 * | 1/2012 | de Leon ................. 382/173 |
| 8,144,874 | B2 * | 3/2012 | McGough ............... 380/277 |
| 2002/0095572 | A1 | 7/2002 | Frank et al. |
| 2004/0123282 | A1 * | 6/2004 | Rao ..................... 717/168 |
| 2005/0114604 | A1 | 5/2005 | Artobello et al. |
| 2009/0245510 | A1 * | 10/2009 | Ciet et al. ............... 380/29 |
| 2010/0037295 | A1 | 2/2010 | Oh et al. |

FOREIGN PATENT DOCUMENTS

WO    2011/120184 A1    10/2011

OTHER PUBLICATIONS

International Search Report and Written Opinion for International Patent Application No. PCT/CN2010/000388, Mailed Dec. 30, 2010, 10 Pages.

\* cited by examiner

Primary Examiner — Saleh Najjar
Assistant Examiner — Oleg Korsak
(74) Attorney, Agent, or Firm — Sutherland Asbill & Brennan LLP

(57) ABSTRACT

Apparatuses and methods for security profile update are presented. In one embodiment, the method comprises determining the version of a security profile associated with a wireless client and determining whether a new security profile exists. The method includes calculating a one-time password based at least on a random character table and some image areas within an image. The method further includes generating an encrypted version of the new security profile by using a first part of the one-time password as an encryption key and sending to the wireless client a profile update request.

14 Claims, 8 Drawing Sheets

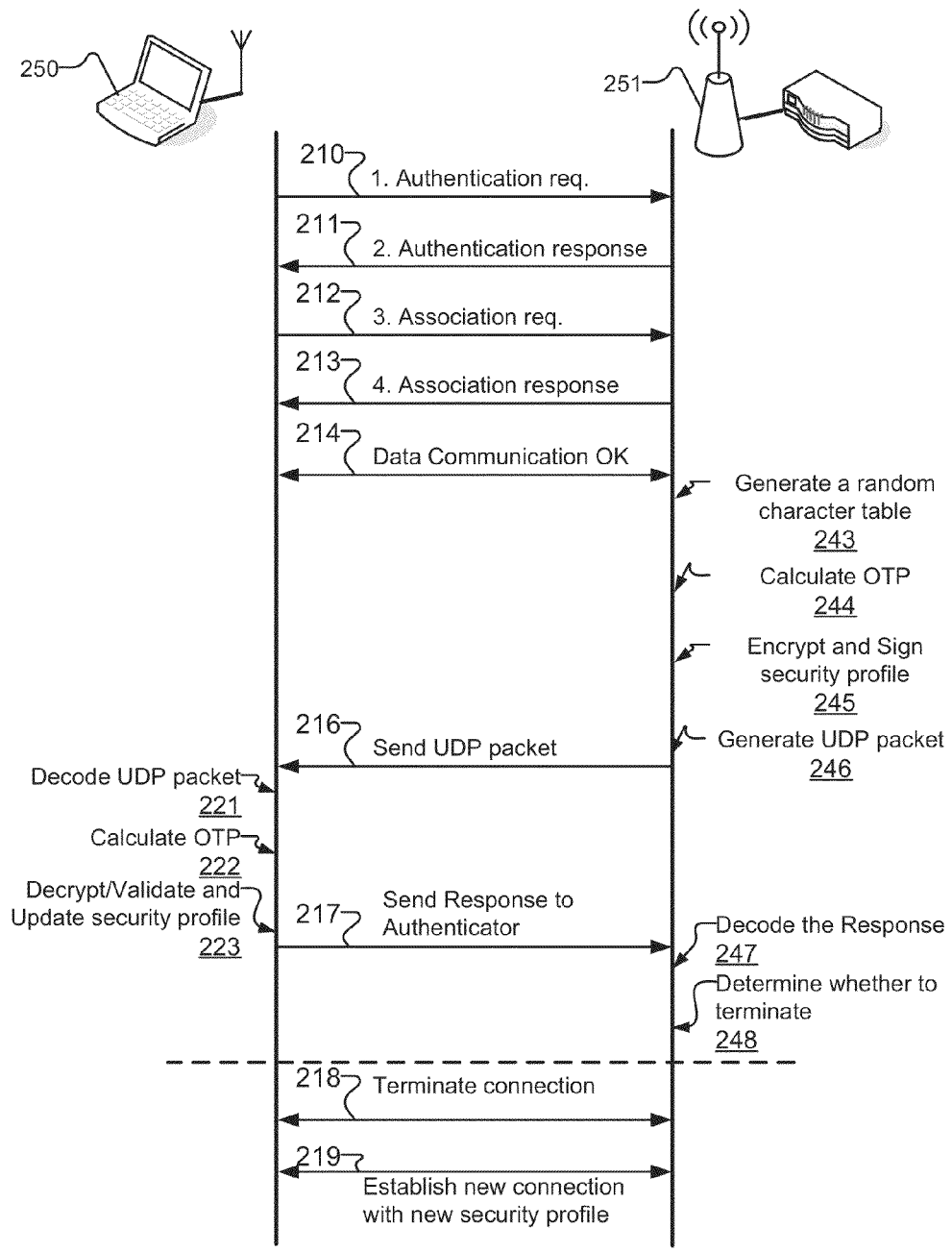

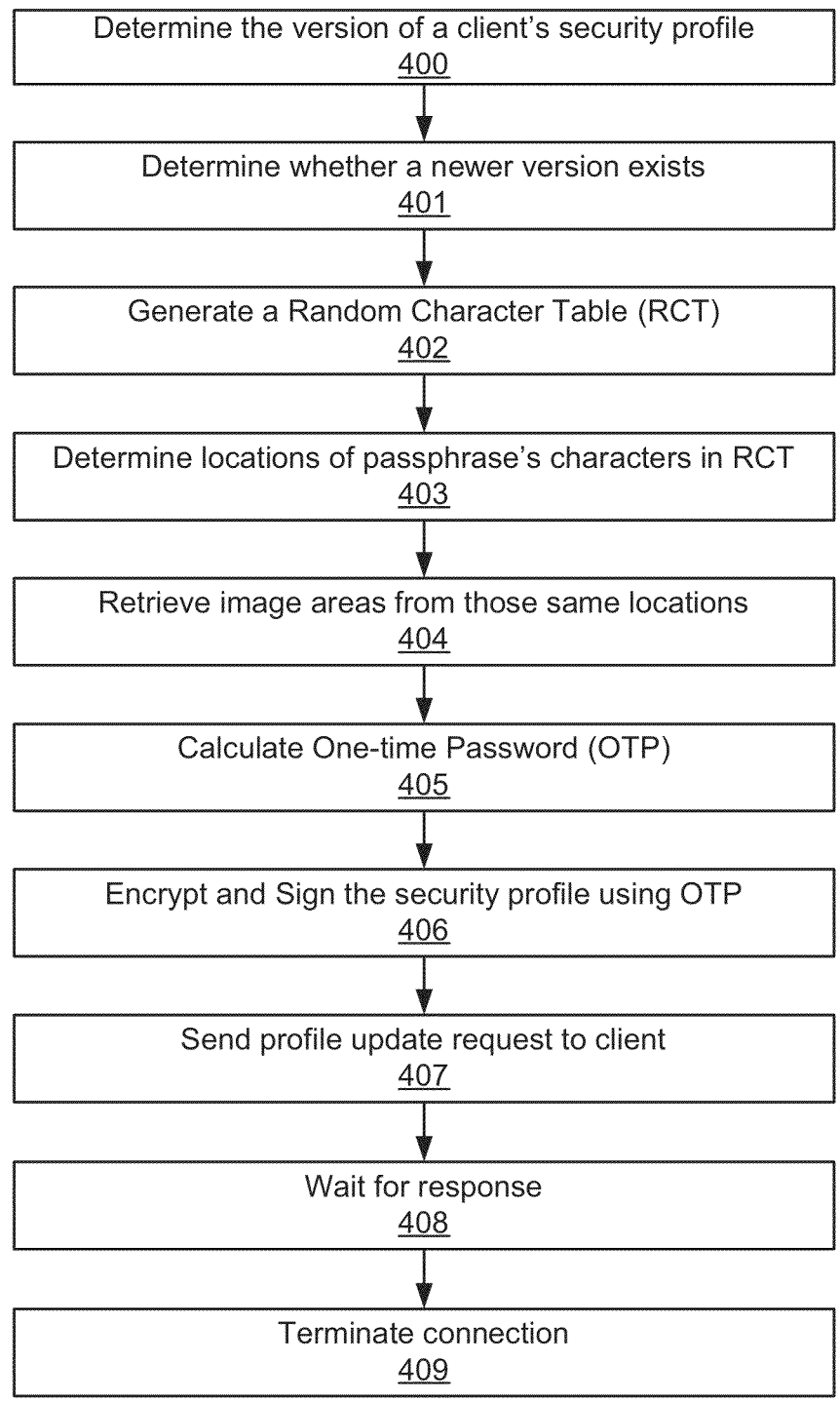

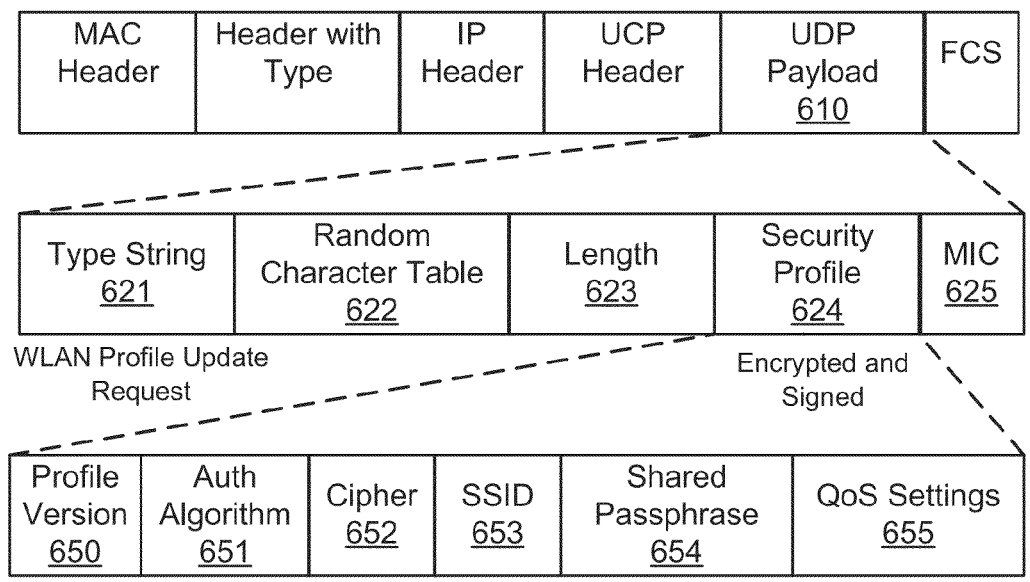

WLAN Profile Update
Response

METHODS AND APPARATUSES FOR ADMINISTRATOR-DRIVEN PROFILE UPDATE

CROSS-REFERENCE TO RELATED APPLICATION

This patent application is a U.S. National Phase application under 35 U.S.C. §371 of International Application No. PCT/CN2010/000388, filed on Mar. 29, 2010, entitled METHODS AND APPARATUSES FOR ADMINISTRATOR-DRIVEN PROFILE UPDATE.

FIELD OF THE INVENTION

Embodiments of the invention relate to the field of data network, and more particularly to wireless network.

BACKGROUND OF THE INVENTION

Wi-Fi Protected Access (WPA) and Wi-Fi Protected Access 2 (WPA2) are wireless security protocols proposed in the IEEE 802.11i specification. For personal wireless network environments, WPA/WPA2 requires PSK (Pre Shared Key) authentication. These standards, however, do not provide an adequate solution to timely and automatically update security profiles that are used in user authentication procedures in personal wireless network.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 2A shows a sequence of operations performed by a communication system in accordance with one embodiment of the invention.

FIG. 4 is a flow diagram of one embodiment of a process to update a security profile.

FIG. 5A shows an embodiment of a data packet which contains information about a profile version.

FIG. 5B shows an embodiment of a data packet which includes a profile update request.

DETAILED DESCRIPTION OF THE INVENTION

Figure 1:
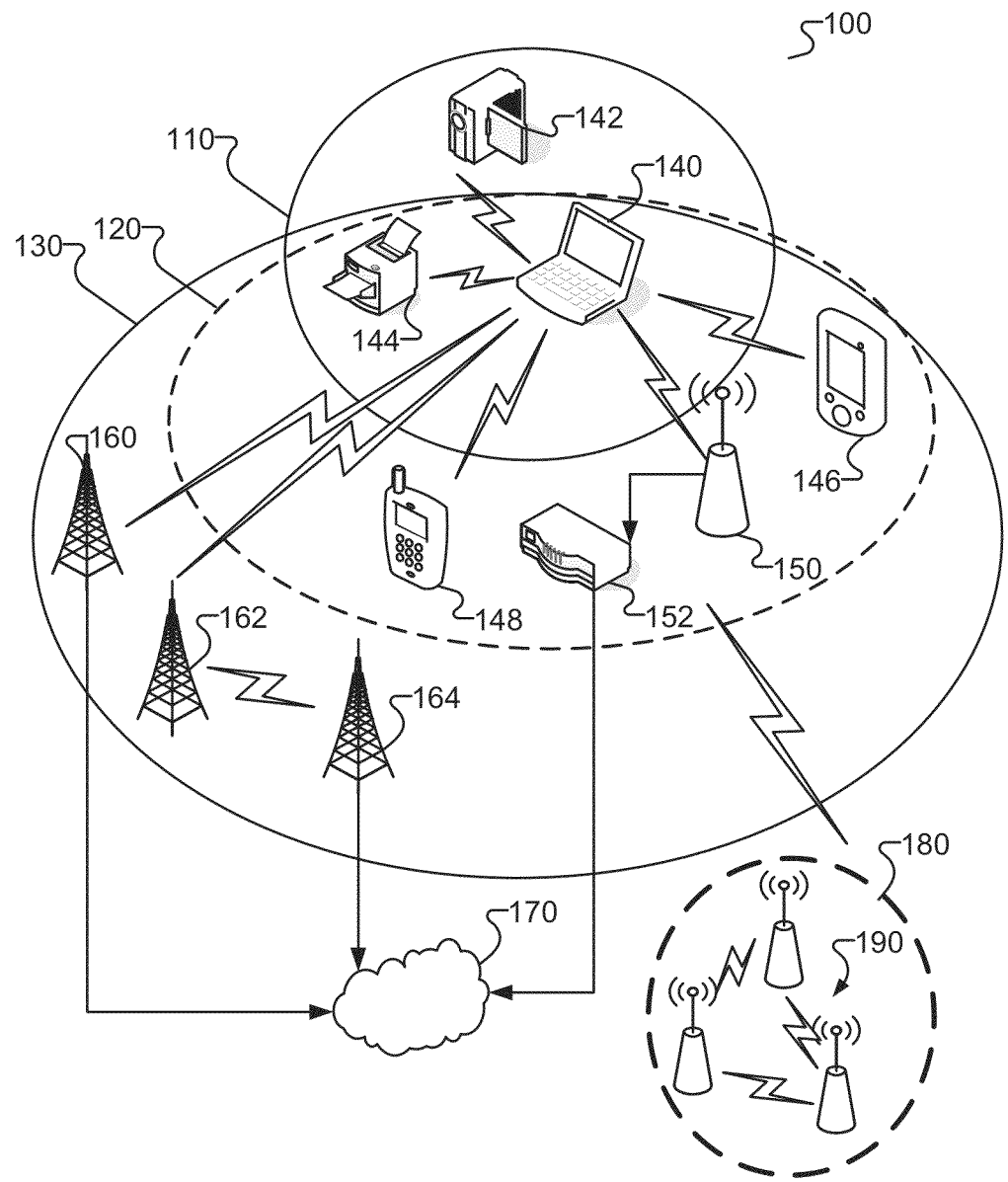
FIG. 1 is a diagram representation of a wireless communication system in accordance with one embodiment of the invention.

Apparatuses and methods for security profile update are presented. In one embodiment, the method comprises determining the version of a security profile associated with a wireless client and determining whether a new security profile exists. The method includes calculating a one-time password based at least on a random character table and some image areas within an image. The method further includes generating an encrypted version of the new security profile by using a first part of the one-time password as an encryption key and sending to the wireless client a profile update request.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Wireless Communication System

FIG. 1 is a diagram representation of a wireless communication system in accordance with one embodiment of the invention. Referring to FIG. 1, in one embodiment, wireless communication system 100 includes one or more wireless communication networks, generally shown as 110, 120, and 130.

In one embodiment, the wireless communication system 100 includes a wireless personal area network (WPAN) 110, a wireless local area network (WLAN) 120, and a wireless metropolitan area network (WMAN) 130. In other embodiments, wireless communication system 100 includes additional or fewer wireless communication networks. For example, wireless communication network 100 includes additional WPANs, WLANs, and/or WMANs. The methods and apparatus described herein are not limited in this regard.

In one embodiment, wireless communication system 100 includes one or more subscriber stations (e.g., shown as 140, 142, 144, 146, and 148). For example, the subscriber stations 140, 142, 144, 146, and 148 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 100 includes more or fewer subscriber stations.

In one embodiment, subscriber stations 140, 142, 144, 146, and 148 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MDM), other suitable modulation techniques, or combinations thereof to communicate via wireless links.

In one embodiment, laptop computer 140 operates in accordance with suitable wireless communication protocols that require very low power, such as, for example, Bluetooth®, ultra-wide band (UWB), radio frequency identification (RFID), or combinations thereof to implement the WPAN 110. In one embodiment, laptop computer 140 communicates with devices associated with the WPAN 110, such as, for example, video camera 142, printer 144, or both via wireless links.

In one embodiment, laptop computer 140 uses direct sequence spread spectrum (DSSS) modulation, frequency hopping spread spectrum (FHSS) modulation, or both to implement the WLAN 120 (e.g., a basic service set (BSS) network in accordance with the 802.11 family of standards developed by the Institute of Electrical and Electronic Engineers (IEEE) or variations and evolutions of these standards). For example, laptop computer 140 communicates with devices associated with the WLAN 120 such as printer 144, handheld computer 146, smart phone 148, or combinations thereof via wireless links.

In one embodiment, laptop computer 140 also communicates with access point (AP) 150 via a wireless link. AP 150 is operatively coupled to router 152 as described in further detail below. Alternatively, AP 150 and router 152 may be integrated into a single device (e.g., a wireless router).

In one embodiment, laptop computer 140 uses OFDM modulation to transmit large amounts of digital data by splitting a radio frequency signal into multiple small sub-signals, which in turn, are transmitted simultaneously at different frequencies. In one embodiment, laptop computer 140 uses OFDM modulation to implement WMAN 130. For example, laptop computer 140 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 160, 162, and 164, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 120 and WMAN 130 are operatively coupled to network 170 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 120 is operatively coupled to network 170 via AP 150 and router 152. In another embodiment, WMAN 130 is operatively coupled to network 170 via base station(s) 160, 162, 164, or combinations thereof Network 170 includes one or more network servers (not shown).

In one embodiment, wireless communication system 100 includes other suitable wireless communication networks, such as, for example, wireless mesh networks, shown as 180. In one embodiment, AP 150, base stations 160, 162, and 164 are associated with one or more wireless mesh networks. In one embodiment, AP 150 communicates with or operates as one of mesh points (MPs) 190 of wireless mesh network 180. In one embodiment, AP 150 receives and transmits data in connection with one or more of MPs 190. In one embodiment, MPs 190 include access points, redistribution points, end points, other suitable connection points, or combinations thereof for traffic flows via mesh paths. MPs 190 use any modulation techniques, wireless communication protocols, wired interfaces, or combinations thereof described above to communicate.

In one embodiment, wireless communication system 100 includes a wireless wide area network (WWAN) such as a cellular radio network (not shown). Laptop computer 140 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, In one embodiment, wireless communication system 100 includes other combinations of WPANs, WLANs, WMANs, and WWANs. The methods and apparatus described herein are not limited in this regard.

In one embodiment, wireless communication system 100 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 140, 142, 144, 146, and 148) AP 150, or base stations (e.g., 160, 162, and 164) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Administrator-Driven Profile Update

FIG. 2A shows a sequence of operations performed by a communication system in accordance with one embodiment of the invention. Referring to FIG. 2A, in one embodiment, the communication system comprises client 250 (e.g., an electronic wireless device with respect to FIG. 1) and authenticator 251 (e.g., an access point with respect to FIG. 1). In one embodiment, client 250 comprises a network apparatus described with respect to FIG. 3. In one embodiment, authenticator 251 comprises a network apparatus described with respect to FIG. 3. In one embodiment, authenticator 251 acts as a server or an administrator with reference to the context of a client-server network.

In one embodiment, a single wireless AP (e.g., authenticator 251) supporting one or multiple wireless clients (e.g., client 250) is known as a Basic Service Set (BSS). A set of two or more wireless APs connected to the same wired network is known as an Extended Service Set (ESS). An ESS is a single logical network segment (also known as a subnet), and is identified by a Service Set Identifier (SSID).

In one embodiment, client 250 sends a request for authentication (process 210) to establish data communication. Authenticator 251 responses to the request (process 211). In one embodiment, client 250 sends an association request to authenticator 251 (process 212). In response, authenticator 251 sends an association response to client 250 (process 213). If the association is successful, client 250 triggers a 4-way handshake with authenticator 251 so that client 250 is able to send data frames. The data communication is established (process 214).

In one embodiment, a wireless security profile includes information for use to establish a secured wireless connection. In one embodiment, a wireless security profile includes information such as, for example, a profile version, authentication algorithms, cipher keys, SSID, a passphrase, and quality of service settings (QoS). A wireless security profile is also referred to herein as a profile or a security profile. Client 250 and authenticator 251 also share at least a common image.

In one embodiment, client 250 encapsulates the version information of a wireless security profile in the association-related data frames. FIG. 5A, for example, shows an element sent in conjunction with an association request/response (e.g., during process 212-213). Based on the profile version information, authenticator 251 determines whether the security profile used by client 250 requires an update. In one embodiment, if authenticator 251 finds that a new version of the security profile exists, authenticator 251 attempts to cause client to update to the new security profile. In one embodiment, a new security profile is assigned with a higher version number or is associated with an identifier which can be used to determine whether the security profile is newer or older.

In one embodiment, authenticator 251 generates a random character table (process 243). Authenticator 251 calculates a one-time password (process 244). The generation of one-time password will be described in further detail below with additional reference to FIG. 2B. It is noted that both client 250 and authenticator 251 have information about each other's IP address and MAC address because client 250 has successfully associated with authenticator 251.

In one embodiment, authenticator 251 encrypts and signs the new security profile by using the generated OTP as a key (process 245). In one embodiment, the generated OTP includes two parts: an OTP-ED part for encryption/decryption purposes and an OTP-SV part for signature and validation purposes. In one embodiment, OTP-ED is used as a key for encrypting and later decrypting a new security profile. In one embodiment, OTP-SV is used for signing and later validating a new security profile.

In one embodiment, authenticator 251 composes UDP data payload which includes a random character table, an encrypted and signed profile (process 246). The UDP data payload includes an identifier to indicate that it is a profile update request. In one embodiment, authenticator 251 prepares UDP data packet in accordance with an example shown in FIG. 5B. Authenticator 251 sends the UDP data packet to client 250 through wireless medium (process 216). In one embodiment, authenticator 251 stores the IP address and the MAC address of client 250.

In one embodiment, client 250 receives the UDP data packet. Client 250 decodes the data packet and retrieves the random character table included therein (process 221). In one embodiment, the random character table is not encrypted. In one embodiment, client 250 calculates a one-time password by using the mechanism described with reference to FIG. 2B (process 222). In one embodiment, by using the random character table, client 250 is able to calculate a same one-time password generated by authenticator 251 (in conjunction with process 244).

In one embodiment, client 250 decrypts and validates the new security profile included in the UDP data packet by using the OTP calculated (process 223). The process of decryption and validation mirrors the operations performed by authenticator 251. In one embodiment, if validation is successful, client 250 installs the new security profile (for example: adopts the new security profile by updating settings to establish a wireless connection according to the new security profile).

In one embodiment, client 250 generates a random digest to prepare a response message (i.e., a profile update response). Client 250 encrypts the random digest by using a part of the OTP (OTP-ED). Client 250 signs the encrypted digest by using another part of the OTP (OTP-SV). Client 250 includes a response message into UDP data payload in accordance with an example shown in FIG. 5C. Client 250 sends the UDP data packet to authenticator 251 as an acknowledgment (process 217).

In one embodiment, among other things, a profile update response includes a status code indicating whether or not client 250 has successfully updated its settings based on the new security profile.

In one embodiment, authenticator 251 decodes the profile update response message to obtain the payload thereof (process 247). Authenticator 251 checks the status code to determine whether the update is successful or otherwise.

In one embodiment, authenticator 251 receives the response message from client 250. Authenticator 251 decodes, decrypts, and validates the response message by using the OTP. In one embodiment, authenticator 251 decrypts the contents of the random digest by using the OTP-ED as a key and then verifies the MIC of the information with the OTP-SV.

If client 250 has performed the updating successfully, the status code will indicate that the update process is successful and the MIC validation (signature checking) is valid. In one embodiment, if the validation fails or if there is a time-out (while waiting for a response from client 250), authenticator 251 terminates the connection to client 250 (process 248).

In one embodiment, client 250 uses the older version of the security profile for performing de-authentication (or disassociation) mechanisms. In one embodiment, after terminating the connection, client 250 establishes a new wireless connection to authenticator 251 in conjunction with the newly installed security profile.

In one embodiment, authenticator 251 invalidates the older version of the security profile associated with client 250 so that client 250 will not be able to use that older version of the security profile again. From this point forward, client 250 uses the new security profile to establish a connection to the network. It is noted that, authenticator 251 may retain the older profiles for other clients which have not updated to the newer profile through the profile-updating process. In one embodiment, authenticator 251 retains two or more profiles to cater for client devices which have not updated to the new security profile.

In one embodiment, TCP mechanism is used for communication of profile update request/response between authenticator 251 and client 250. For that, a 3-Way TCP handshake procedure is performed before sending out a profile update request/response.

In one embodiment, the encryption in performed by using a symmetric cryptography algorithm (e.g., AES).

In one embodiment, the security profile update is performed without the need to recall client devices (e.g., client 250).

In one embodiment, updating a security profile (administrator-driven) is used in conjunction with other protocols, such as, for example, IEEE 802.16 and IEEE 802.21, IEEE 802.11, IEEE 802.15, and LTE/3G.

Figure 2B:
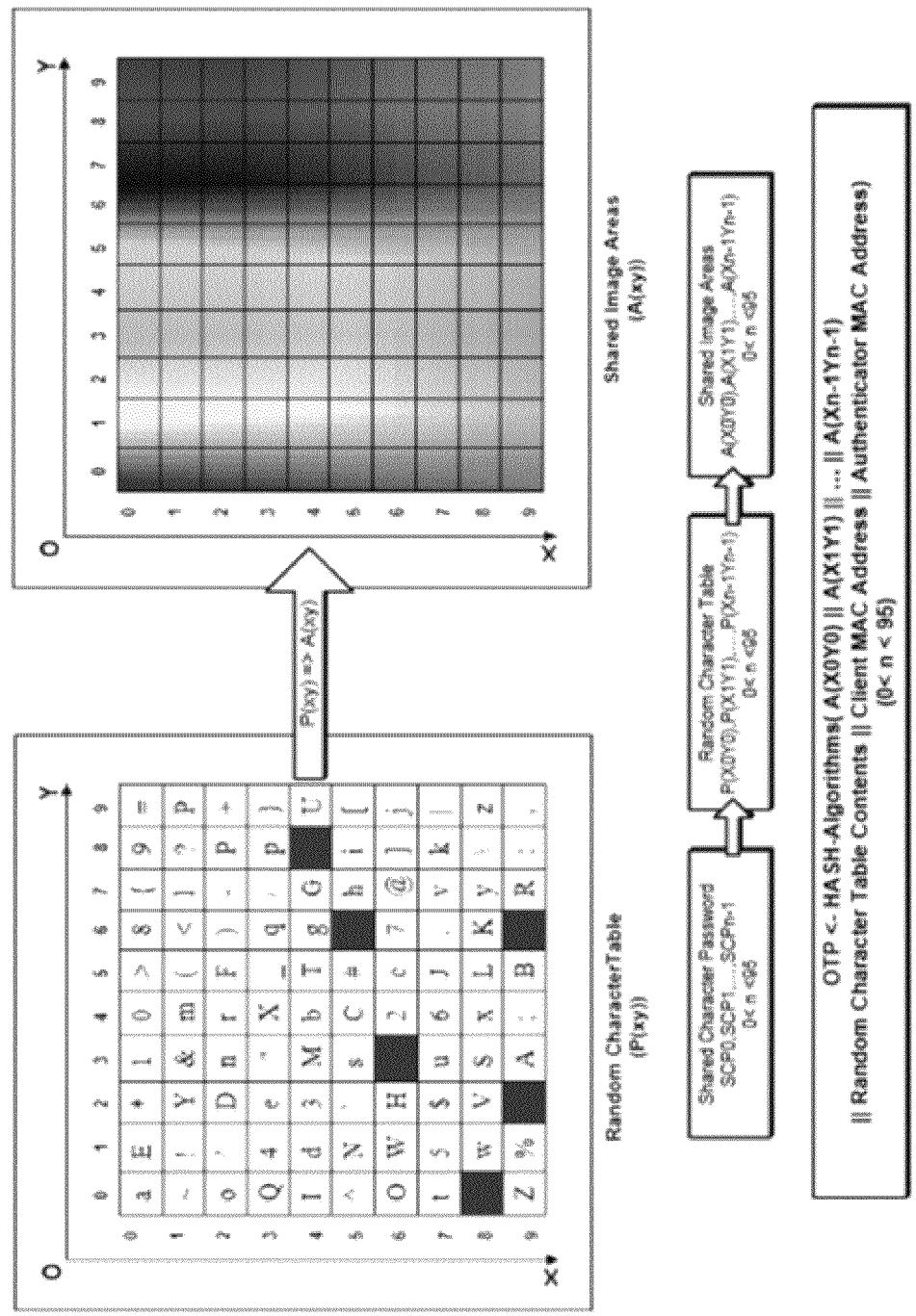
FIG. 2B is a diagram to show examples of a random character table and an image for use in generating a one-time password in accordance with an embodiment of the invention.

FIG. 2B is a diagram to show examples of a random character table and an image for use in generating a one-time password in accordance with an embodiment of the invention. Referring to FIG. 2B, in one embodiment, an authenticator generates a random character table.

In one embodiment, both a client and an authenticator are pre-configured with same shared multi-factor secrets which include a shared character password and a shared image. The shared character password is also referred to herein as a passphrase. The shared character password and the shared image will be used in conjunction with random character table 80 to generate a one-time password (OTP).

In one embodiment, random character table 80 has 10 rows and 10 columns and includes specific characters that are used to compose a passphrase. The characters within random character table 80 are all different from one another and are randomly generated. In addition, six of the positions in random character table 80 include blank characters, which cannot be used in the passphrase. This leaves 96 characters for composing a one-time password. It should be understood that other alternative random character table formats may be used.

In one embodiment, an authenticator (or a client) is able to retrieve, from memory, the passphrase and a shared image. The passphrase (shared character password) and the shared image are, for example, generated by a network administrator and stored in the authenticator before a client device or an authenticator device is delivered to end users.

In one embodiment, a passphrase includes a string of characters, all of which will be within the random character table. The shared image is an image having image portions (image areas) arranged in the same manner as the characters in the random character table. For example, FIG. 2B illustrates a shared image 82 that are used in conjunction with random character table 80. Referring to FIG. 2B, shared image 82 is divided into 100 image areas in a 10×10 arrangement. Individual image portions (image areas) should be different from each others. In one embodiment, the image areas are randomly generated.

In one embodiment, generating a one-time password (OTP) begins by an authenticator identifying the locations of characters (of the passphrase) within random character table 80. For example, if the shared character password is "aED4d" then, using random character table 80, the locations are (0,0), (0,1), (2,2), (3,1), and (4,1). Corresponding image portions at these same locations are then selected from the shared image as A(0,0), A (0,1), A (2,2), A (3,1), and A (4,1). Contents of these image portions are used as user credentials.

In one embodiment, an OTP is be calculated by using a hash algorithm. In one embodiment, the hash algorithm is an inconvertible hash algorithm. For example, the hash algorithm is applied on data as follows:

$$OTP=HASH(A(X0Y0)|A(X1Y1)|\ldots|A(Xn\text{-}1Yn\text{-}1)$$
|Random Character Table Contents|Client's MAC Address|Authenticator's MAC Address)

In one embodiment, the generated OTP is divided two parts: an OTP-ED part for encryption/decryption purposes and an OTP-SV part for signature and validation. In one embodiment, OTP-ED is used as a key for encrypting and later decrypting a new security profile. In one embodiment, OTP-SV is used for signing and later validating a new security profile.

Wireless Communication Device

Figure 3:
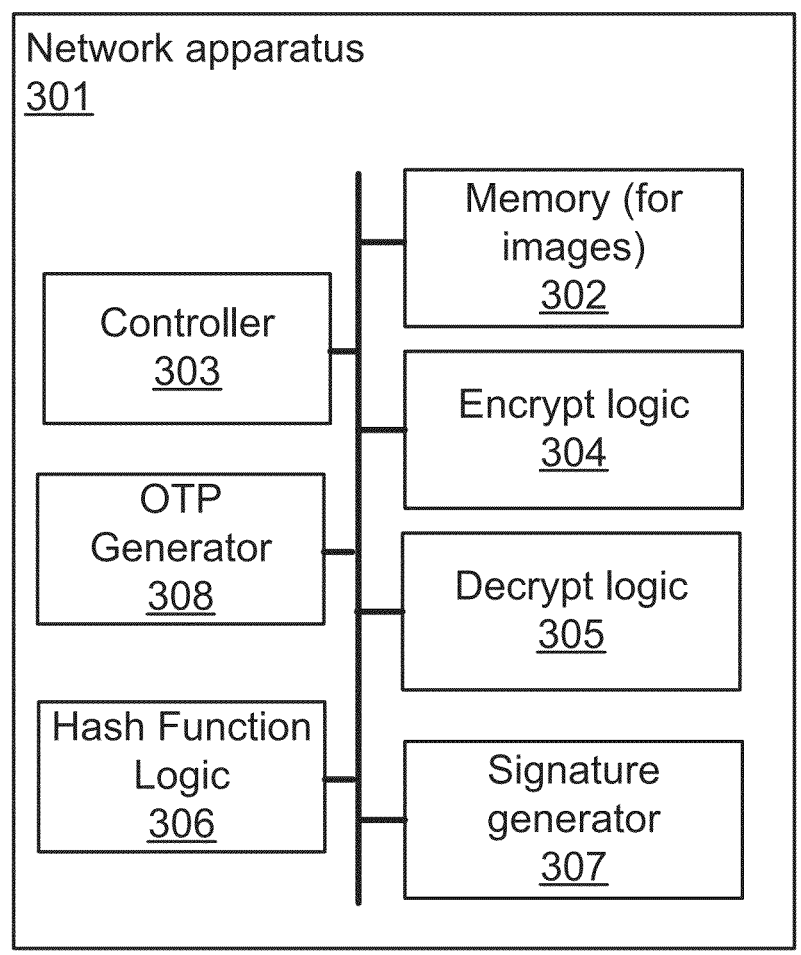
FIG. 3 shows a network apparatus in accordance with one embodiment of the invention.

FIG. 3 shows a network apparatus in accordance with one embodiment of the invention. In one embodiment, the network apparatus is an embodiment of a wireless electronic device, a server, an access point, or a base station with respect to FIG. 1.

Referring to FIG. 3, in one embodiment, network apparatus 301 comprises controller 303, hash function logic 306, memory 302, encrypt logic 304, decrypt logic 305, signature generator 307, and one-time password (OTP) generator 308. In one embodiment, the aforementioned units are shown as discrete devices. Other embodiments are possible where some or all of these units are integrated within a device or within other devices. In other embodiments, the aforementioned units are distributed throughout a system in hardware, software, or some combination thereof.

In one embodiment, controller 303 manages and coordinates operations of one-time password (OTP) generator 308, hash function logic 306, encrypt logic 304, decrypt logic 305, and other components (not shown), such as, for example, a transceiver, an antenna, a power control unit, etc.

In one embodiment, one-time password generator 308 calculates a one-time password based on a random character table, an image, and a passphrase with reference to the example in FIG. 2B. In one embodiment, a one-time password is used in conjunction with wireless protocols known in the art, for example, IEEE 802.11i standard ("IEEE 802.11i-2004: Amendment 6: Medium Access Control (MAC) Security Enhancements", IEEE Standards. 2004-07-23).

In one embodiment, memory 302 stores one or more images for use in operations for calculating a one-time password. In one embodiment, images are pre-shared with another system before establishing a wireless connection. In one embodiment, system administrators store one or more images for generating one-time passwords. In one embodiment, memory 302 also stores a pre-shared passphrase. In other embodiment, the passphrase is referred to as a character password.

In one embodiment, hash function logic 306 performs a hash operation on a message. In one embodiment, hash function logic 306 supports SHA (Secure Hash Algorithm) functions, such as, for example, SHA-0, SHA-1, and SHA-2. In one embodiment, hash function logic 306 performs a SHA-2 variant on a 256-bit message digest (e.g., SHA-256). In other embodiments, hash function logic 306 is able to perform a SHA function on various sized of message digests (e.g., SHA-224, SHA-256, SHA-384, and SHA-512). In one embodiment, hash function logic 306 operates in conjunction with OTP generator 308 to calculate a one-time password.

In one embodiment, encrypt logic 304 encrypts a message (information) by performing an encryption algorithm. In one embodiment, decrypt logic 305 decrypts an encrypted version of a message to retrieve an original message. In one embodiment, encrypt logic 304 performs AES encryption on a security profile. In one embodiment, decrypt logic 305 performs AES decryption on encrypted information. In one embodiment, encrypt logic 304 and decrypt logic 305 support symmetric key algorithms (e.g., DES, RC4, RC5, AES, etc.). A client and an authenticator share the knowledge of a symmetric key.

FIG. 4 is a flow diagram of one embodiment of a process to update a wireless security profile. The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., network apparatus 301 with respect to FIG. 3). In one embodiment, the process is performed by a computer system with respect to FIG. 6.

Referring to FIG. 4, in one embodiment, processing logic begins by determining (process block 400). Processing logic gathers information about a security profile version associated with a client. In one embodiment, processing logic is able to determine whether the security profile used by the client requires an update (process block 400). In one embodiment, if processing logic finds that a new version of the security profile exists, processing logic attempts to cause the client to update to the new security profile (process block 401).

In one embodiment, processing logic generates a random character table (process 402). Processing logic determines locations of characters (a passphrase's characters) within a random character table (process block 403). Processing logic retrieves/identifies images areas of the same locations within an image (process block 404).

In one embodiment, processing logic generates a one-time password (OTP) by performing a hash function operation on data including contents from the image areas, contents of a random character table, MAC addresses, IP addresses, or combinations thereof (process block 405).

In one embodiment, processing logic encrypts and then signs a new security profile by using the generated OTP (process 406). In one embodiment, the generated OTP includes two parts: an OTP-ED part for encryption/decryption purposes and an OTP-SV part for signature and validation purposes. In one embodiment, OTP-ED is used as a key for encrypting and decrypting a security profile. In one embodiment, OTP-SV is used for signing and later validating a security profile.

In one embodiment, processing logic composes UDP data payload which includes a profile update request to a client (process block 407). Processing logic sends the profile update request to the client.

In one embodiment, processing logic waits for a response from a client (process block 408). In one embodiment, if a client does not respond within a pre-determined time-out, processing logic determines that the client is not functioning properly. Processing logic then terminates a connection to the client (process block 409).

In one embodiment, the UDP data payload includes an identifier to indicate that it is a profile update request. In one embodiment, processing logic prepares UDP data packet in accordance with the example shown in FIG. 5B. In one embodiment, the client receives the update profile request. The client decrypts and validates the new security profile. In one embodiment, if validation is successful, the client installs the new security profile.

In one embodiment, processing logic receives a profile update response which includes a status code indicating whether or not the client has successfully updated its settings based on the new security profile. Processing logic decodes, validates, and decrypts the response message by using the generated OTP. Processing logic checks the status code to determine whether the update is successful or otherwise. In one embodiment, if the validation fails or if there is a time-out (while waiting for a response from the client), processing logic terminates the connection to the client.

In one embodiment, processing logic invalidates the older version of the security profile associated with the client so that the client will not be able to use the older version of the security profile. From this point forward, the client uses the new profile to establish a connection to the network.

FIG. 5A shows an embodiment of a data packet which contains information about a profile version. Referring to FIG. 5A, in one embodiment, the element is included in data packets for exchanging profile information when a client and an authenticator (for example, during association). Profile version 602 contains version information about the security profile in use in accordance with an embodiment of the present invention. In one embodiment, the element includes element ID 600, element length 601, and profile version 602.

FIG. 5B shows an embodiment of a data packet which includes a profile update request from an authenticator to a client. Referring to FIG. 5B, the figure shows a data packet which is a profile update request including random character table 622, an encrypted version of a new security profile 624, and MIC 625. In one embodiment, type string 621 is set to "WLAN profile update request" indicating that this packet is a request for profile update. Random character table 622 is used by both a client and an authenticator to calculate an one-time password. Length 623 is the total size of encrypted content of the new security profile (in bytes). Encrypted version of the new wireless security profile is a result generated by using the OTP-ED key. MIC 625 is a result generated by using the OTP-SV key to sign the original content of the new security profile.

In one embodiment, a wireless security profile includes information such as, for example, profile version 650, authentication algorithms 651, cipher keys 652, SSID 653, shared passphrase 654, and quality of service settings 655 (QoS).

Figure 5C:
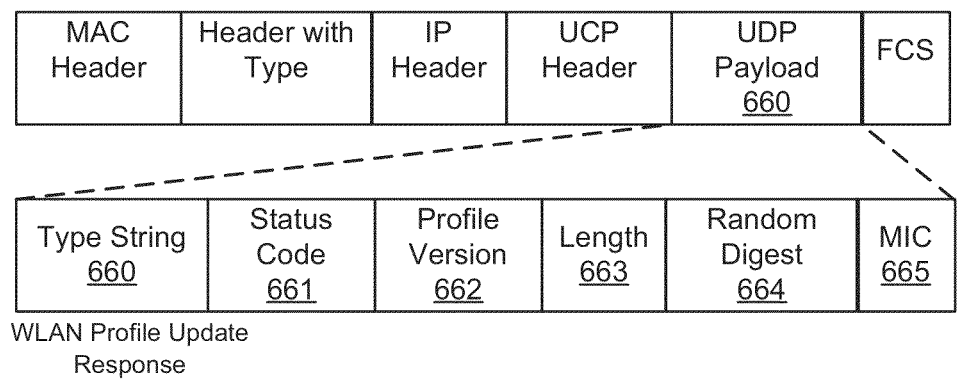
FIG. 5C shows an embodiment of a data packet which includes a profile update response.

FIG. 5C shows an embodiment of a data packet which includes a profile update response. Referring to FIG. 5C, In one embodiment, the figure shows a data packet which is a profile update response including type string 660, status code 661, profile version 662, length 663, an encrypted version of random digest 664, and MIC 665.

In one embodiment, type string 660 is set to "WLAN profile update response" indicating that this packet is a response to a profile update. In one embodiment, status code 661 is to indicate whether client has successfully updated the new profile or otherwise.

Profile version 662 of the new security profile is maintained by an authenticator. Length 663 indicates the total size of the encrypted version of a random digest in bytes. The encrypted version of a random digest 664 is a result generated by using the OTP-ED. MIC 665 is a result generated by using the OTP-SV key to sign the original content of a random digest generated by the client. In one embodiment, if status code 661 indicates that the process of updating is not successful contents in other data fields become irrelevant.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 6:
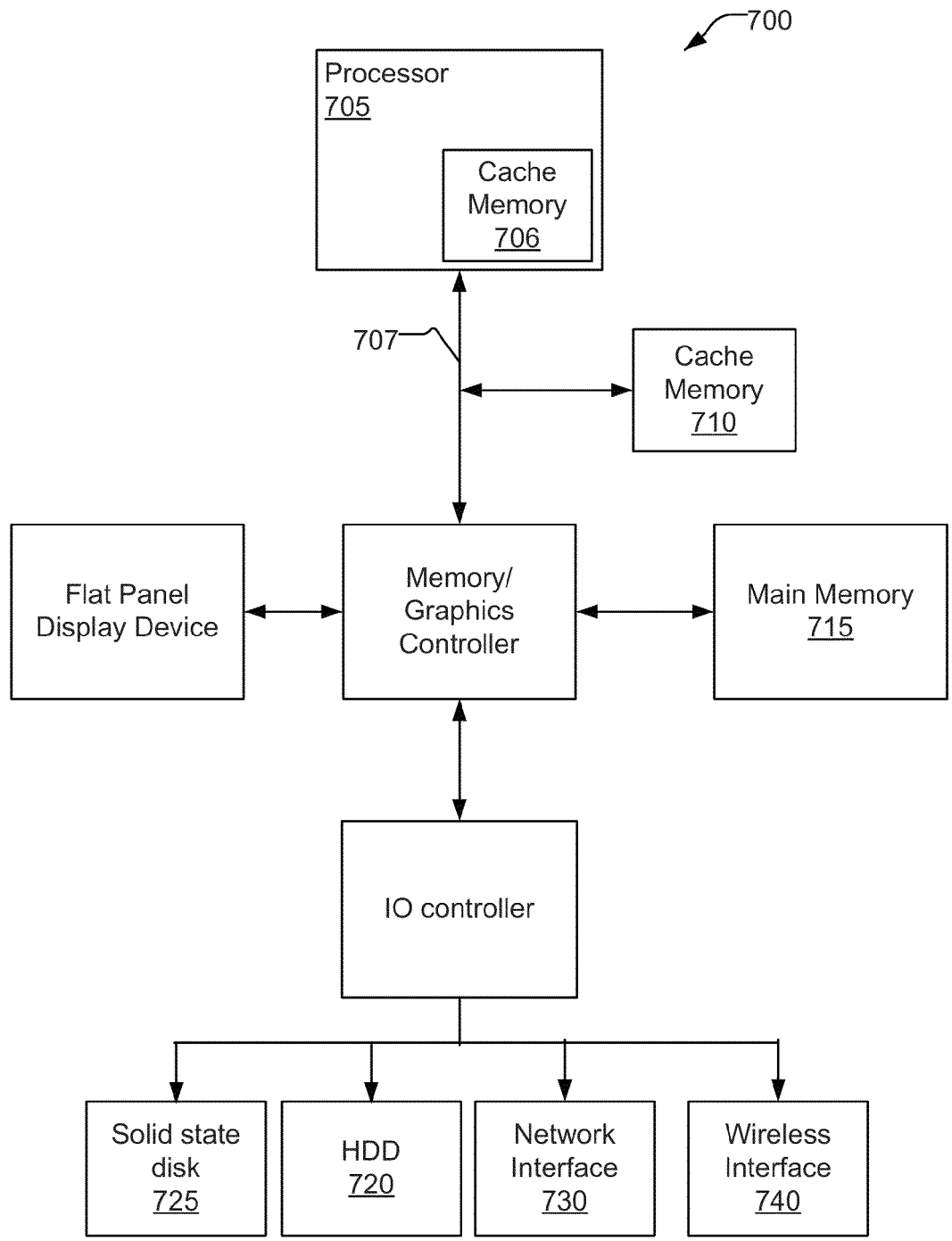
FIG. 6 illustrates a computer system for use with one embodiment of the present invention.

FIG. 6 illustrates an example of computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer implemented method comprising: determining a version of a first security profile associated with a wireless client;
   determining whether a second security profile which is of a newer version as compared with the first security profile exists;
   calculating a one-time password based at least on a random character table and a first plurality of image areas within an image;
   generating an encrypted version of the second security profile by using a first part of the one-time password as an encryption key, the encrypted second security profile is to be sent to the wireless client; and
   sending to the wireless client a profile update request which includes at least the random character table and the encrypted version of the second security profile.

2. The method of claim 1, further comprising signing the encrypted second security profile with a second part of the one-time password.

3. The method of claim 1, wherein the calculating the one-time password comprises:
   generating the random character table including a plurality of randomly generated characters;

determining a first plurality of locations at which characters of a character password are arranged within the random character table;
retrieving the first plurality of image areas that have the same locations within the image as the first plurality of locations; and
generating the one-time password (OTP) by using a hash function on data including the random character table and contents of the first plurality of image areas.

4. The method of claim 1, further comprising:
terminating a connection to the wireless client if no response from the wireless client arrives within a first period;
terminating the connection to the wireless client if a response from the wireless client indicating that an updating process at the wireless client has been completed;
receiving a new connection request from the wireless client which uses the second security profile; and
invalidating the future use of the first security profile by the wireless client.

5. The method of claim 1, further comprising retaining two or more security profiles including the first and the second security profile to cater other wireless clients which have not received the second security profile, each of the security profiles includes at least a new character password and is associated with a version identifier.

6. The method of claim 3, wherein the random character table comprises a 10×10 table of characters including N blank characters, where N is an integer less than 100, wherein the image comprises 10×10 image areas.

7. The method of claim 3, wherein the hash function is an inconvertible hash function.

8. A computer implemented method comprising:
decoding, in response to a profile update request, the profile update request includes at least a random character table and an encrypted version of a first security profile;
extracting a random character table from the profile update request;
retrieving a character password and an image from a memory;
calculating a one-time password based at least on the random character table, the character password, and a first plurality of image areas within the image;
decrypting the encrypted first security profile by using a first part of the one-time password as a key;
determining to save the first security profile based at least on a version associated with the first security profile;
updating a wireless setting based on the first security profile; and
sending a response, to a wireless authenticator that sent the profile update request, to indicate the updating is complete.

9. The method of claim of claim 8, wherein the calculating the one-time password comprises:
determining a first plurality of locations at which characters of the character password are arranged within the random character table;
retrieving the first plurality of image areas that have the same locations within the image as the first plurality of locations; and
generating the one-time password (OTP) by using a hash function on data including the random character table and contents of the first plurality of image areas.

10. The method of claim of claim 8, further comprising validating the encrypted
version of the first security profile by using a second part of the one-time password.

11. The method of claim 9, wherein the first security profile includes at least a new second character password and a version identifier.

12. A network apparatus comprising:
digital storage to store character passwords associated with a number of different client devices and shared images associated with a number of different client devices; and
a controller operable to:
determine a version of a first security profile associated with a wireless client;
determine whether a second security profile which is of a newer version as compared with the first security profile exists;
calculate a one-time password based at least on a random character table and a first plurality of image areas within an image;
generate an encrypted version of the second security profile by using a first part of the one-time password as an encryption key, the encrypted second security profile is to be sent to the wireless client; and
sign the encrypted version of the second security profile using a second part of the one-time password; and
send to the wireless client a profile update request which includes at least the random character table and the encrypted version of the second security profile.

13. The network apparatus of claim 12, wherein the controller is operable to generate the random character table including a plurality of randomly generated characters;
determine a first plurality of locations at which characters of a character password are arranged within the random character table;
retrieve the first plurality of image areas that have the same locations within the image as the first plurality of locations; and
generate the one-time password (OTP) by using a hash function on data including the random character table and contents of the first plurality of image areas.

14. The network apparatus of claim 12, wherein the controller is operable to
terminate a connection to the wireless client if no response from the wireless client arrives within a first period;
terminate the connection to the wireless client if a response from the wireless client indicating that an updating process at the wireless client has been completed;
receive a new connection request from the wireless client which uses the second security profile; and
invalidating the future use of the first security profile by the wireless client.

* * * * *